United States Patent
Roos et al.

(10) Patent No.: US 8,835,005 B2
(45) Date of Patent: Sep. 16, 2014

(54) PROCESS FOR PRODUCING GRANULES

(75) Inventors: Willem Frederik Roos, Hoensbroek (NL); Fredericus Henricus Maria Buitink, Grathem (NL)

(73) Assignee: Stamicarbon B.V., Sittard (NL)

( * ) Notice: Subject to any disclaimer, the term of this patent is extended or adjusted under 35 U.S.C. 154(b) by 0 days.

(21) Appl. No.: 13/394,800

(22) PCT Filed: Aug. 10, 2010

(86) PCT No.: PCT/EP2010/061620
§ 371 (c)(1),
(2), (4) Date: May 21, 2012

(87) PCT Pub. No.: WO2011/029682
PCT Pub. Date: Mar. 17, 2011

(65) Prior Publication Data
US 2012/0231277 A1 Sep. 13, 2012

(30) Foreign Application Priority Data
Sep. 10, 2009 (EP) ..................... 09169913

(51) Int. Cl.
*B32B 5/16* (2006.01)

(52) U.S. Cl.
USPC .............. 428/403; 427/212; 23/301

(58) Field of Classification Search
USPC .............. 428/403; 427/212; 23/301
See application file for complete search history.

(56) References Cited

U.S. PATENT DOCUMENTS

| 4,219,589 A | * | 8/1980 | Niks et al. ............. 427/213 |
| 5,653,781 A | | 8/1997 | Kayaert et al. |
| 7,438,729 B2 | | 10/2008 | Bedetti |
| 7,838,080 B2 | | 11/2010 | Rumpler et al. |

FOREIGN PATENT DOCUMENTS

| CN | 101160271 | | 4/2008 |
| EP | 0 900 589 | | 3/1999 |
| EP | 0900589 | * | 3/1999 |
| JP | S54016427 | | 2/1979 |
| JP | H07-222920 | | 8/1995 |
| JP | H09-500608 | | 1/1997 |
| JP | H11137988 | | 5/1999 |
| JP | 2009-504584 | | 2/2009 |
| WO | WO94/03267 | * | 2/1994 |
| WO | WO-94/03267 | | 2/1994 |
| WO | WO-2006/111331 | | 10/2006 |
| WO | WO-2007/017159 | | 2/2007 |
| WO | WO2007/017159 | * | 2/2007 |

OTHER PUBLICATIONS

International Search Report for PCT/EP2010/061620, mailed Feb. 15, 2011, 3 pages.
Search Report for CN 201080046735.8, mailed Sep. 25, 2013, 2 pages.
Office Action in Japanese Patent Application No. JP-2012-528294, issued Apr. 21, 2014, 4 pages (English translation).

* cited by examiner

*Primary Examiner* — Leszek Kiliman
(74) *Attorney, Agent, or Firm* — Morrison & Foerster LLP

(57) ABSTRACT

The present invention relates to a process for the preparation of granules comprising the steps of: providing a granulation zone comprising particles, the particles being kept in motion; providing a first feed stream comprising a liquid composition into the granulation zone, the liquid composition being applied onto or over the moving particles in the granulation zone; withdrawing a product stream comprising granules from the granulation zone, the granules being the result of layered growth of the moving particles in the granulation zone; wherein a second feed stream comprising granulation nuclei is fed into the granulation zone, wherein the granulation nuclei have a particle size distribution characterized by a standard deviation of the particle size that is less than 15% of the mean particle size, and wherein the second feed stream comprises between 0.05 wt % and 50 wt % of the product stream.

12 Claims, 3 Drawing Sheets

PROCESS FOR PRODUCING GRANULES

CROSS-REFERENCE TO RELATED APPLICATIONS

This application is the national phase of PCT application PCT/EP2010/061620 having an international filing date of 10 Aug. 2010, which claims benefit of European patent application No. 09169913.2 filed 10 Sep. 2009. The contents of the above patent applications are incorporated by reference herein in their entirety.

The present invention relates to a process for the preparation of granules and the granules.

Such a process is known in the art and generally comprises the steps of:
- providing a granulation zone comprising particles, the particles being kept in motion;
- providing a first feed stream comprising a liquid composition into the granulation zone, the liquid composition being applied onto or over the moving particles in the granulation zone;
- withdrawing a product stream comprising granules from the granulation zone, the granules being the result of layered growth of the moving particles in the granulation zone;

U.S. Pat. No. 5,779,945 discloses an example of such a process. In this patent a process for producing granules also comprises a cooling step after the withdrawal of the product stream from the granulation zone.

Generally, the withdrawn product stream is divided, in a size-sorting apparatus, into three streams of grown particles based on size. A stream of desired-sized particles is withdrawn for future use or processing. A stream of undersized particles is returned to the granulation zone. A stream of over-sized particles is sent to a size-reducing unit after which the size-reduced particles are at least partly returned to the granulation zone.

A disadvantage of such a process is that the stream of particles that is discharged from the granulation zone has a broad particle size distribution. This requires recycling of both undersized and oversized particles into the granulation process in order to obtain a granulated product with a desired particle size distribution. This means additional classification equipment and connecting lines need to be installed. The size of the equipment has to be increased to allow the additional throughput of product due to recirculation of these oversized and undersized particles. This incurs additional cost and increases the cost price of produced material.

For grass root plants the investments are high due to the presence of the recycle streams of undersized and oversized particles.

Another disadvantage of the known process is dust formation. Dust is mainly formed in the granulation zone and in the crushing step.

Dust formation in the granulation zone may be caused by the formation of granulation nuclei by solidification of droplets of the liquid composition that is fed to the granulation zone. A part of these nuclei will grow in the granulation zone to form granules. Another part of the granulation nuclei will be removed from the granulation zone as dust. If for example, the granulation process is carried out in a fluidized bed, the air flow required to fluidize the growing particles present in the granulation zone may be too high to keep all granulation nuclei in the fluidized bed. A part of the formed granulation nuclei may therefore be removed as dust by the fluidizing air.

The crushing step, or a size reduction step in general, usually involves applying a mechanical force onto the oversized particles (e.g. by a double roll crusher), which force exceeds the crushing strength of the particles. Crushing particles is a rather undefined process which not only results in breaking oversized particles into two or more smaller parts, but also in dust formation.

Known granulation processes produce approximately 1-10 wt % dust, which is an undesired by-product. If dust is present in the granule product, the risk of caking and baking in the granulator or in a storage vessel significantly increases, in particular in humid conditions. Therefore, dust formation requires the process to be equipped with gas cleaners and dust recycles. These additional process steps require large amounts of water to be recirculated in the process and have a high energy consumption.

Increasing the capacity of an existing granulation facility is therefore not only limited because of the recycle streams, but also non-economical and therefore unattractive.

It is an object of the present invention to eliminate or at least mitigate at least one of the above disadvantages, such that an economically attractive granulation process is achieved.

This object is achieved by a process for the preparation of granules comprising the steps of:
- providing a granulation zone comprising particles, the particles being kept in motion;
- providing a first feed stream comprising a liquid composition into the granulation zone, the liquid composition being applied onto or over the moving particles in the granulation zone;
- withdrawing a product stream comprising granules from the granulation zone, the granules being the result of layered growth of the moving particles in the granulation zone;

characterized in that a second feed stream comprising granulation nuclei is fed into the granulation zone, wherein the granulation nuclei have a particle size distribution characterized by a standard deviation of the particle size that is less than 15% of the mean particle size, and wherein the second feed stream comprises between 0.05 wt % and 50 wt % of the product stream.

The product stream of such a process comprises granules with a narrow particle size distribution, which at least partly eliminates the above stated disadvantages of granulation processes. In a preferred embodiment the particle distribution is so narrow that there may be no need anymore for classification equipment, thereby simplifying the whole granulation process and lowering the overall cost price of produced granules. In this preferred embodiment there also may be no need for a crusher, which will also reduce the formation of dust in the overall granulation process.

An additional advantage of the process according to the present invention is the fact that the addition of solid granulation nuclei reduces the amount of crystallization heat that needs to be removed from the granulator per kilogram of produced granules. The granulation nuclei added to the granulator in the second feed stream have been produced in a separate process where they have been solidified and the crystallization heat already is removed in said separate process.

Another advantage of the process according to the present invention is that due to the narrow particle size distribution of the granulation nuclei, the growing particles in the granulation zone also have a narrow particle size distribution, which may lead to a more stable operation of the granulation process, in particular if the granulation is carried out in a fluid bed or spouted bed. The narrower the particle size distribution of the growing particles in the granulator is, the better the fluidization gas flow can be increased without compromising the stability of the bed (i.e. a narrower particle size distribution in the fluid bed leads to a smaller risk of blowing out light particles and/or caking and/or baking of heavy particles). Increasing the fluidization gas flow may also benefit the heat transfer in the granulator, which enables an increase of the throughput of the granulator.

The mean particle size of the granulation nuclei depends on the desired particle size of the product and the maximum amount of liquid composition that can be supplied to the granulator. In general the mean particle size of the granulation nuclei lies between 0.05 mm and 5 mm, preferably between 0.1 mm and 3.5 mm, more preferably between 0.2 mm and 2 mm. The standard deviation of the particle size preferably is less than 12%, more preferably less than 10% of the mean particle size.

Due to residence time distribution of the growing particles in the granulation process, which depends, among others, on the design of the granulator, the standard deviation of the particle size of the growing particles may increase during the granulation process. Therefore the standard deviation of the particle size of the granulation nuclei is preferably below the standard deviation of the desired product, for example 20% lower. The increase of the standard deviation of the particle size of the growing particles in the granulator may be decreased by the design of the granulator. If the granulator is divided in a series of sections in series, for example by placing baffles in the granulator, allowing continuous flow of growing particles from one section to the next, the increase of the standard deviation of the growing particles may be reduced. The second feed stream comprising granulation nuclei is preferably introduced in the first section.

The particle size in the sense of the present invention is equal to the smallest pore or maze size of a screen or sieve through which the particle can pass. For spherical particles and pastilles, the latter being of a shape that resembles half a sphere, the diameter is the critical parameter which determines whether or not the particle passes through a pore of maze of a screen or sieve.

The particle size distribution is determined according to ASTM E11-61. Use is made of the Tyler Mesh sieves (see also chemical Engineers handbook, edition 5, R. H. Perry et al, page 21-41).

A number (n) of screens or sieves are used to classify the particles into n+1 fractions of particles. The first screen or sieve having a pore size $p_1$, the first fraction comprising particles having a particle size larger than $p_1$, the so called coarse fraction. The second sieve or screen having a pore size of $p_2$, the second fraction having a particle size of between $p_1$ and $p_2$. The fraction passing the last, i.e. the $n^{th}$ sieve or screen comprises the so called 'fines' which includes dust. The weight of each fraction is determined. The mean particle size ($\mu$) is calculated according to the following formula (1):

$$\mu = \frac{1}{W_{tot}} \sum_{i=1}^{n+1} W_i * x_i \qquad \text{Formula (1)}$$

wherein:
$\mu$ is the mean particle size,
$W_{tot}$ is the total weight of particles,
$W_i$ is the weight of particles in the $i^{th}$ fraction,
$x_i$ is the mean particle size of the $i^{th}$ fraction, which equals $(p_{i-1}+p_i)/2$,
n+1 is the total number of fractions.

The standard deviation is calculated according to the following formula (2):

$$\sigma = \sqrt{\frac{1}{W_{tot}} \sum_{i=1}^{n+1} W_i (x_i - \mu)^2} \qquad \text{Formula (2)}$$

wherein:
$\sigma$ is the standard deviation, and
$W_{tot}$, $W_i$, $x_i$, $\mu$ and n+1 have the above meaning.

The above method for determining the mean particle size and standard deviation, requires the presence of at least two fractions of particles.

If, with a certain set of sieves, only a single fraction of particles is obtained, one may decide to use a different set of screens or sieves having pore sizes between the pore sizes of the two screens or sieves that define said single fraction. The result of this is that the obtained single fraction may be separated into multiple fractions with a more narrow range of particle sizes per fraction. The above method can again be used to determine the mean particle size and the standard deviation.

If, with a certain set of sieves, only a single fraction of particles is obtained, the mean particle size and standard deviation may also be determined according to the formulas below (3 and 4):

$$\mu = x_i \qquad \text{Formula (3)}$$

$$\sigma = \left|\frac{p_{i-1} - p_i}{6}\right| \qquad \text{Formula (4)}$$

wherein $\mu$, $x_i$, $\sigma$, $p_{i-1}$, and $p_i$, have the previously described meaning.

The mean particle size thus equals $x_i$ (i.e. the mean particle size of said single fraction), which is the average pore size of the screens or sieves defining said single fraction: $(p_{i-1}+p_i)/2$. Assuming a normal distribution of particle sizes within said single fraction, the maximum deviation of the particle size from the mean particle size equals $+/-3\sigma$. All particles in said single fraction are therefore contained in a window from $-3\sigma$ to $+3\sigma$. The boundaries of this window are determined by the pore sizes of the screens or sieves that define said single fraction, $p_{i-1}$, and $p_i$. The standard deviation ($\sigma$) is therefore determined by Formula (4).

The latter method (using formulas 3 and 4) is particularly useful when particles are produced with a very narrow particle size distribution, for example particles produced in a pastillation process.

In a process according to the present invention, the product stream may be divided into three streams. A first stream of oversized (i.e. coarse) particles, a second stream of desired-sized particles and a third stream of undersized (i.e. fine) particles. The mean particle size and standard deviation may be calculated in the above indicated way.

The amount of granulation nuclei to be introduced in the granulator is expressed as a relative amount by weight with respect to the product stream that is withdrawn from the granulator. Preferably the second feed stream comprises between 0.1 wt % and 40 wt %, more preferably between 0.5 wt % and 25 wt %, even more preferably between 0.75 wt % and 15 wt % and between 1 wt % and 10 wt %. and most preferably between 1 wt % and 5 wt %.

The granulation nuclei may be obtained by any known process, for example prilling, pastillation, a separate (pre-) granulation process, or sieving a fraction of desired particle size distribution from a product with a broader particle size distribution. Preferably the granulation nuclei are obtained from a prilling or pastillation process, more preferably a pastillation process. The granulation nuclei may either be fed to the granulator from a storage vessel or directly by coupling one of the above processes in series with the granulator.

In a preferred embodiment pastilles (i.e. product obtained with the pastillation process) with a mean size between 1 mm and 2 mm with a standard deviation of less than 15% of the mean size are fed to a granulator in an amount of between 1 and 25 wt % of the product stream.

If for example a granule product is desired with an average particle size of 3 mm, starting from granulation nuclei with an average particle size of 1 mm, the second feed stream comprises 4 wt % of the product stream and the first feed stream comprising the liquid composition which is sprayed into the granulation zone comprises 96 wt % of the product stream. The crystallization heat to be transferred in the granulation zone is reduced with 4%.

In an embodiment, the granulation process is carried out in a fluidized bed or in a spouted bed. Spouted bed technology comprises specially designed equipment for products that are difficult to fluidize, for example a product with a very broad particle size distribution, a coarse product, a very fine product or particles that have a tendency to form lumps because of their stickiness.

The invention further pertains to granules obtainable by a process according to the present invention. Such granules comprise a core and a shell. The core is made of a first composition by a first process, in particular pastillation. The shell is made of a second composition and applied in the granulation process according to the present invention, resulting in a layered structured deposited on the core.

In an embodiment, the core of the particles has a lower density than the shell of the particles. This difference is caused by the processing. The cores are manufactured for example by a prilling or pastillation process, preferably by a pastillation process. The shell is gradually formed in the granulation process by layered growth of the granulation nuclei. Due to the fact that in the prilling and pastillation process the liquid material crystallizes from the outside of the particle to the inside, while the layered particle growth in a granulation process causes the material to crystallize from the inside to the outside of the particles, the core may have a lower density than the shell.

In an embodiment the density of the core is between 0.1%-5%, preferably between 0.5-3% en more preferably between 1-2%, below the density of the shell.

In an embodiment, the first composition and the second composition comprise a compound which for each composition may be independently selected from the group consisting of ammonium nitrate, ammonium sulphate, ammonium phosphate, mixtures of these ammonium salts, calcium ammonium nitrate, magnesium ammonium nitrate, compound NP fertilizers, compound NPK fertilizers, urea, urea containing compositions, sulphur, bisphenol and caprolactam.

In an embodiment, the first composition and the second composition comprise urea, the density of the granule being below 1330 kg/m$^3$, preferably below 1320 kg/m$^3$. The granules preferably have an average size between 1 mm and 10 mm, more preferably between 2 mm and 5 mm.

The invention will now be further explained with reference to the following appended Figures.

The present process for the production of granules from a liquid composition, such as, for example, a solution, melt or suspension, involves applying the liquid composition onto solid particles of the same composition moving in a granulation zone of a granulator, thereby causing solid particles of the composition to grow, and then discharging, when, for example, the solid particles grow to a selected size, a stream of the grown solid particles from the granulation zone.

Figure 1:
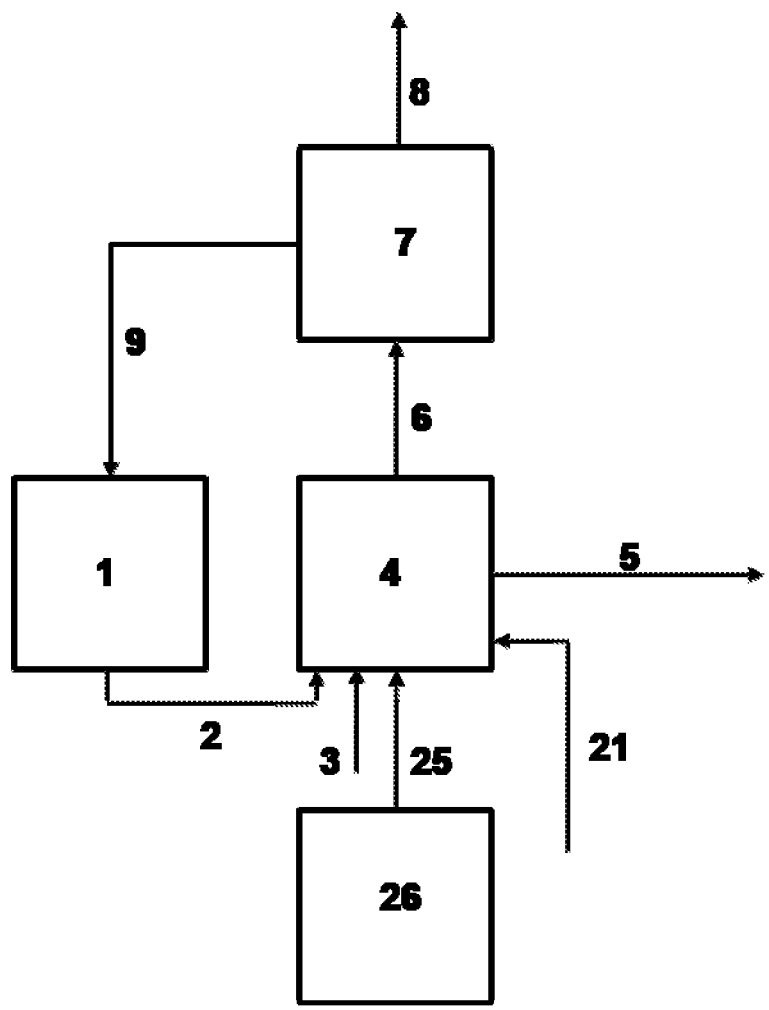
FIG. 1 shows a schematic representation of an embodiment of the present invention comprising a granulator with a feed stream of particles with a narrow particle size distribution.

FIG. 1 is a schematic representation showing an embodiment of the present invention.

For the production of granules from a liquid composition, such as a urea solution, a solution of the liquid composition is passed from a storage vessel 1 via an evaporation step through line 2 to a granulator 4 and is sprayed into the granulator with or without the aid of a gas stream 3. The liquid composition may be sprayed into the granulator with a spraying device as disclosed in for example EP 0 141 436. Preferably the liquid is sprayed into the granulation zone as a conical film.

A second feed stream 25 comprising particles with a nearly uniform particle size is introduced into the granulator, where the particles gradually grow such that granules are formed. Granules are continuously discharged from the granulator via line 5.

Preferably the granulator is divided into several sections, each section approaching an ideally stirred tank. The sections being arranged such that the discharge stream of a section is the feed stream for the next section. In this arrangement plug flow conditions with little axial dispersion are obtained. The result of this is that the narrow particle size distribution of the particles in the second feed stream may be preserved to a large extend during the granulation process, hence leading to a product with a similar narrow particle size distribution.

Figure 4A:
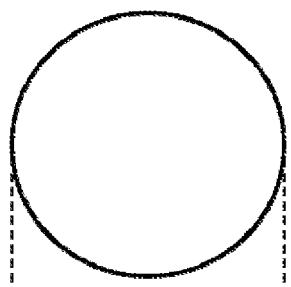
FIG. 4 shows a schematic representation of a pastille: A) top view; B) front view.
Figure 4B:
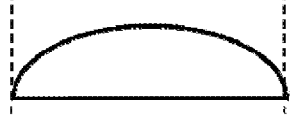

The second feed steam 25 may be supplied from a storage vessel 26 or directly from a process such as prilling or pastillation. Prilling is a process wherein, for example, a urea solution is concentrated to 99.7% urea. The resultant molten stream is prilled with the aid of a rotating prilling bucket in a prilling tower. Using an optional technique of seeding when prilling, impact resistant prills are obtained. These prills are very resistant to degradation during product handling. Pastillation is a process, for example, performed with a Sandvik Rotoformer. In this process drops of nearly uniform size of, for example, urea melt, are deposited on a steel belt cooler. Upon cooling, the drops solidify into a nearly half spherical shape and have a nearly uniform particle size (see FIG. 4).

Other processes realizing a product with a narrow particle size distribution are also suitable for the production of the second feed stream for the granulator.

The temperature in the storage vessel 1 is between, for example, about 50° C. and about 250° C., depending on the product to be granulated. In the case of urea granulation, the temperature in the storage vessel is between about 70° C. and about 100° C. in particular between about 75° C. and about 99° C. The temperature in the granulator is between about 60° C. and about 180° C. and in the case of urea granulation preferably between about 90° C. and about 170° C. The amount of gas in gas stream 3 is in the range from about 0 to about 0.9 kilogram per kilogram of liquid composition. The temperature of gas stream 3 is about 20° C. to about 180° C., and in the case of urea granulation preferably between about 90° C. and about 140° C. In the case of a fluid bed or a spouted bed, fluidization gas, such as air, is supplied to the granulator through line 21. In the case of a pan or drum granulation process, ambient air is supplied to the granulator through line 21. The gas stream leaving the granulator is passed through line 6 to a gas/solids separating apparatus 7 such as a cyclone or scrubber, where solid material, primarily dust, is separated from the gas carrying it, with the gas being discharged through line 8. The dust separated from the gas stream can be returned via line 9, optionally diluted with a solvent such as water, to the storage vessel 1 and resupplied to the granulator 4.

Figure 2:
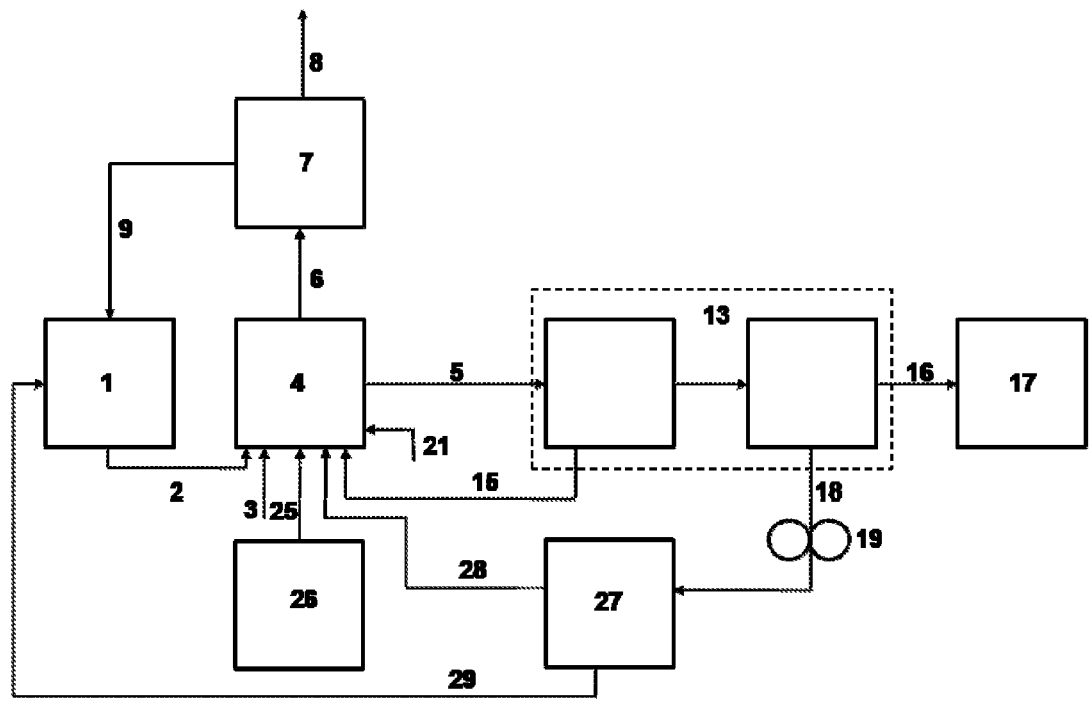
FIG. 2 shows a schematic representation of another embodiment of the present invention further comprising recycle streams.

FIG. 2 is a schematic representation of another embodiment of the present invention.

In this embodiment, the granules discharged from the granulator via line 5 undergo an additional treatment. The additional treatment comprises a classification of the produced granules by particle size by using a size-sorting apparatus, for example, a sizing sieve or screen. In the size-sorting or screening apparatus 13 the granulate is divided into three streams, namely oversized, desired-sized and undersized particles. The undersized particles are returned via line 15 to the granulator 4 to serve as nuclei on which solid particles of the liquid composition can grow during the granulation process. Desired-sized particles pass via provision 16 to storage 17 whereafter they may be sold or used in a downstream process. Oversized particles are passed through line 18 to a size-reducing or crusher apparatus 19 where they are converted into crushed particles with an average particle diameter of about 1.2 to about 2.4 mm, preferably about 1.5 to about 2.1 mm if the desired-sized product has a diameter of about 2 to about 4 mm. Dust formation is inherent in this crushing process. An overview of such crushing equipment can for example be found in Perry and Chilton Chemical Engineers Handbook. fifth edition pages 8-16 to 8-57. For the present invention especially the equipment called Roll-crushers as described in this reference on pages 8-19 to 8-22 are suitable. In the case of urea granulation, the desired-sized particle usually has preferably a granule diameter of between about 2 and 4 mm. The oversized particle has a diameter greater than about 4 mm and the undersized particle has a diameter less than about 2 mm. However, other granule diameters are applicable also. In the case of, for example, the production of urea granules for forestry with aerial application, the granule diameter of a desired-sized particle is between 5 and 15 mm, preferably between 7 and 10 mm. The stream of crushed solid particles is then separated in a second size-sorting or screening apparatus 27 (e.g. by sieves or screen) into a stream that is recycled to the granulation zone 28 and a stream 29 that is liquefied (e.g. melted, dissolved, dispersed) and recycled to storage vessel 1.

Figure 3:
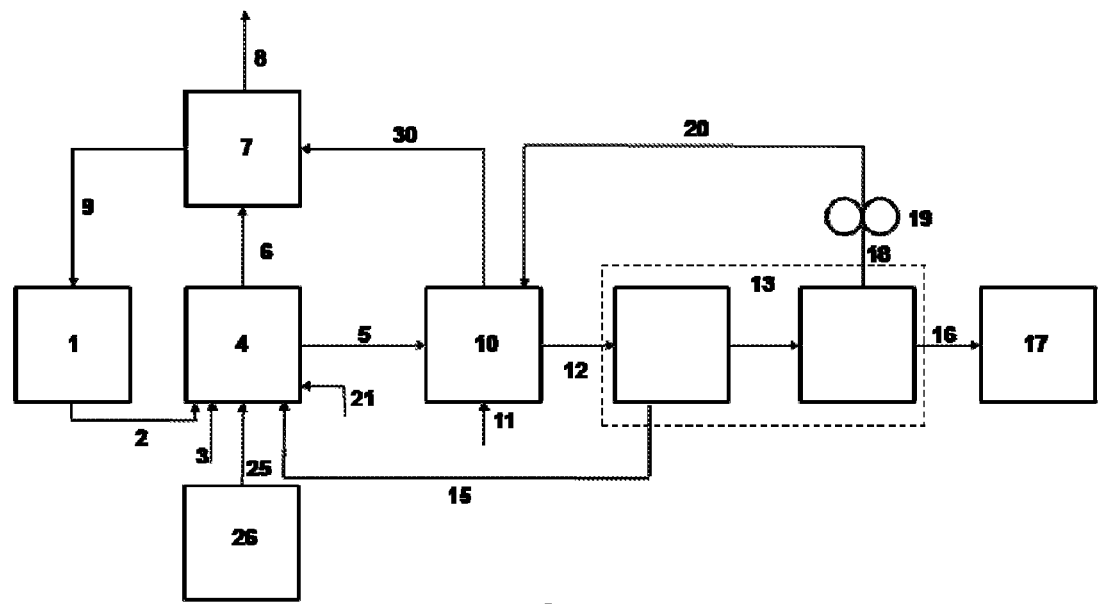
FIG. 3 shows a schematic representation of yet another embodiment of the present invention further comprising a cooler.

FIG. 3 shows a schematic representation of yet another embodiment of the present invention. In this embodiment the granulate leaving the granulator 4 via line 5 is cooled in a cooler 10 with the aid of a gas stream 11 supplied to the cooler, whereafter the granulate is passed through line 12 to a size-sorting or screening apparatus 13. The obtained three streams of oversized 18, desired-sized 16 and undersized particles 15, are then treated as previously described. The crushed particles, along with the dust produced in the crushing process, are returned through line 20 to the cooler 10 downstream of the granulator 4. The gas stream leaving the cooler 30 is directed to a gas/solids separating apparatus 7. This step reduces the amount of dust which accumulates in the granulator and thereby increases the time between production shutdowns due to granulator cleaning.

The temperature of the gas stream 11 supplied is about 10° C. to about 80° C., and the amount is between about 0.5 and about 5 kilograms of gas per kilogram of granules supplied to the cooler. In the case of urea granulation the temperature of the gas stream is preferable between about 10° C. to about 50° C. and the temperature at which the urea granules exit the cooler is between about 20° C. and about 80° C., more preferably between about 25° C. and about 75° C. The gas stream leaving the cooler 10 via line 14 is transferred to the aforementioned gas/solids separating apparatus 7. This separating apparatus 7 may be comprised of for example two separate apparatuses or a combined apparatus for cleaning the dust-laden air from the granulator 4 and/or the air from the cooler 10.

Preferably, the cooler and the granulator are operated at a slight underpressure. "Slight underpressure" means an underpressure of about 0 to 100 mm water, preferably 0 to 70 mm water.

This invention can be applied to all sorts of liquid compositions in the form of a solution, melt or suspension. Examples of suitable materials to be granulated are ammonium salts, such as ammonium nitrate, ammonium sulfate or ammonium phosphate as well as mixtures thereof, simple fertilizers such as calcium ammonium nitrate, magnesium ammonium nitrate, compound NP and NPK fertilizers, urea, urea-containing compositions, sulfur and the like. The invention is particularly suited for granulating simple and complex fertilizers and especially for granulating urea.

The invention can suitably be applied to various granulation processes in which both the undersized and the crushed oversized particles are recirculated entirely within the granulation process. Examples thereof are fluid bed granulation. spouted bed granulation, pan granulation or drum granulation processes, such as are described in Perry's Chemical Engineers' Handbook, pgs. 8-71. 20-59 to 20-74 (6th Ed., 1984), the complete disclosure of which is incorporated herein by reference.

The process according to the invention can be carried out in, for example, an installation, as generally described in, for example. U.S. Pat. No. 4,219,589, the complete disclosure of which is incorporated herein by reference, consisting of a granulator such as a fluid bed granulator, a cooler, a screening apparatus, an apparatus for crushing oversized particles and a gas/solid separating apparatus for separating solid particles from the gas stream leaving the granulator and/or the cooler.

The following non-limiting examples further describe the present invention.

COMPARATIVE EXAMPLE A

In a test set-up, urea was granulated in a fluid bed granulator at a temperature of about 110° C., in a cylindrical fluid bed having a diameter of 45 cm. The fluid bed was bounded on the underside by a porous plate 6% of which consisted of 1.8 mm diameter holes. Cold air flowed through the holes into the fluid bed at a superficial velocity of about 2 m/s. An overflow was provided at the top side of the bed 70 cm above the bottom plate. A liquid distributing device as described in EP-A-0-141-436, was placed at the center of the bottom plate.

Urea melt at about 140° C. containing about 0.5 wt % water was supplied at a rate of about 200 kg/h from a urea storage vessel to the fluid bed granulator while the liquid distributing device operated at about 140° C., with air supplied at a rate of about 90 kg/h. The urea granules emerging from the bed were cooled in a cooler to about 40° C., with the aid of a cold gas and then screened on flat-bed screens.

Approximately 200 kg/h of granules having a grain size between about 2 and 4 mm, 30 kg/h of granules greater than about 4 mm and 150 kg/h of granules less than about 2 mm were obtained. The small granules were returned directly to the fluid bed granulator. A stream of oversized granules of about 30 kg/h went to a size-reducing apparatus which consisted of a double roll crusher adjusted for an average granule size of 1.4 mm. The crushed granules were supplied back to the cooler at a rate of about 30 kg/h.

Urea dust was extracted from the gas stream exiting the fluid bed granulator at a rate of about 8 kg/h and from the cooler at a rate of about 5 kg/h. These dust streams were passed to a gas/solid separator, where the urea dust was separated and added to the urea storage vessel.

After 29 days of continuous operation. the fluid bed granulator became blocked and the test was terminated.

COMPARATIVE EXAMPLE 2

Ammonium nitrate was granulated in a test set-up of a spouted bed granulator. The spouted bed was located in a cylindrical vessel of 45 cm diameter, which was provided at the underside with a conical section converging downward at an angle of 30 degrees to the vertical and terminating in the air supply pipe. Air at about 35° C. entered the apparatus at a rate of about 400 kg/h and a velocity of about 40 m/s. The granules in the spouted bed had a temperature of about 100° C. The overflow was located in the cylindrical section of the spouted bed, 30 cm above the transition from the conical section to the cylindrical section.

Ammonium nitrate melt at about 180° C. containing about 0.5 wt. % of water and about 1.5 wt % of $Mg(NO_3)_2$. was spouted into the air stream at a rate of about 100 kg/h. The ammonium nitrate granules emerging from the spouted bed granulator were transferred to a cooler and cooled to about 40° C. and then screened on flat bed screens.

Approximately 100 kg/h of granules with a grain size between about 2 and 4 mm, 10 kg/h of granules greater than about 4 mm and 75 kg/h of granules less than about 2 mm were obtained. The granules less than about 2 mm were returned to the spouted bed granulator. The granules greater than about 4 mm were passed to a size-reducing apparatus, which was adjusted for an average grain size of 1.4 mm and then returned to the cooler. Dust was extracted by a gas/solid separator from the gas streams exiting the spouted bed granulator at a rate of about 3 kg/h and at a rate of about 2 kg/h from the cooler.

The spouted bed granulator became blocked and the test was terminated after 27 day of continuous operation.

EXAMPLE 1

In a test set-up, according to comparative example A, urea was granulated in a fluid bed granulator at a temperature of about 110° C. Cold air flowed through the holes into the fluid bed at a superficial velocity of about 2 m/s. An overflow was provided at the top side of the bed 70 cm above the bottom plate. Urea melt at about 140° C. containing about 1.5 wt % water was supplied at a rate of about 190 kg/h from a urea storage vessel to the fluid bed granulator while the liquid distributing device operated at about 140° C., with air supplied at a rate of about 90 kg/h. A second feed stream comprising pastilles of solid urea with a particle size of between 1 mm and 1.4 mm (as produced, so: $\mu=1.2$ mm and $\sigma=(1.4-1)/6=0.067$ mm; $\sigma/\mu=0.056$ (5.6%)) was added to the fluid bed granulator at a rate of 10 kg/h. The urea granules emerging from the bed were cooled in a cooler to about 40° C., with the aid of a cold gas and then screened on flat-bed screens.

Approximately 200 kg/h of granules having a grain size between about 2 and 4 mm were obtained and directly discharged to the storage facilities. Lumps with a size greater than 4 mm at a rate lower than 0.1 kg/h are separated with a lump screen and discharged to a dissolving vessel.

Urea dust was extracted from the gas stream exiting the fluid bed granulator at a rate of about 4 kg/h and from the cooler at a rate of about 2 kg/h. These dust streams were passed to a gas scrubbing system, where the urea dust was washed out of the air with the help of water and sent back to the urea plant for further treatment.

EXAMPLE 2

In a test set-up, according to comparative example A, urea was granulated in a fluid bed granulator at a temperature of about 110° C. Cold air flowed through the holes into the fluid bed at a superficial velocity of about 2 m/s. An overflow was provided at the top side of the bed 70 cm above the bottom plate. Urea melt at about 140° C. containing about 1.5 wt % water was supplied at a rate of about 190 kg/h from a urea storage vessel to the fluid bed granulator while the liquid distributing device operated at about 140° C., with air supplied at a rate of about 90 kg/h. A second feed stream comprising pastilles of solid urea with a particle size of between 1.7 mm and 2.2 mm (as produced, so: $\mu=1.95$ mm and $\sigma=(2.2-1.7)/6=0.083$ mm; $\sigma/\mu=0.043$ (4.3%)) was added to the fluid bed granulator at a rate of 50 kg/h. The urea granules emerging from the bed were cooled in a cooler to about 40° C., with the aid of a cold gas and then screened on flat-bed screens.

Approximately 250 kg/h of granules having a grain size between about 2 and 4 mm, 10 kg/h of granules greater than about 4 mm and 50 kg/h of granules less than about 2 mm were obtained. The small granules were returned directly to the fluid bed granulator. A stream of oversized granules of about 10 kg/h went to a size-reducing apparatus which consisted of a double roll crusher adjusted for an average granule size of 1.4 mm. The crushed granules were supplied back to the cooler at a rate of about 30 kg/h.

Urea dust was extracted from the gas stream exiting the fluid bed granulator at a rate of about 6 kg/h and from the cooler at a rate of about 3 kg/h. These dust streams were passed to a gas scrubbing system, where the urea dust was washed out of the air with the help of water and sent back to the urea plant for further treatment.

The invention claimed is:

1. Process for the preparation of granules comprising the steps of:
   providing a granulation zone comprising particles, the particles being kept in motion;
   providing a first feed stream comprising a liquid composition into the granulation zone, the liquid composition being applied onto or over the moving particles in the granulation zone;
   withdrawing a product stream comprising granules from the granulation zone, the granules being the result of layered growth of the moving particles in the granulation zone;
   characterized in that a second feed stream comprising granulation nuclei is fed into the granulation zone, wherein the granulation nuclei have a particle size distribution characterized by a standard deviation of the particle size that is less than 15% of the mean particle size, and wherein the second feed stream comprises between 0.05 wt % and 50 wt % of the product stream.

2. Process according to claim 1, wherein the granulation nuclei have a particle size between 0.05 mm and 5 mm.

3. Process according to claim 2, wherein the granulation nuclei have a particle size between 0.2 mm and 2 mm.

4. Process according to claim 1, wherein the standard deviation of the particle size is less than 12% of the mean particle size.

5. Process according to claim 1, wherein the second feed stream comprises between 0.1 wt % and 40 wt % of the product stream.

6. Process according to claim 5, wherein the second feed stream comprises between 0.5 wt % and 25 wt % of the product stream.

7. Process according to claim 1, wherein the granulation nuclei in the second feed stream are obtained by prilling or pastillating.

8. Process according to claim 1, wherein the second feed stream comprises pastilles, the pastilles having a mean size between 1 and 2 mm with a standard deviation of less than 15% of the mean size, the second feed stream comprises between 1 wt % and 25 wt % of the product stream.

9. The process according to claim 8, wherein the second feed stream comprises between 1 wt % and 5 wt % of the product stream.

10. Process according to claim 1, wherein the granulation takes place in a spouted bed or in a fluidized bed.

11. Granules, comprising a core and a shell, the core comprising a first composition, the shell comprising a layered structure of a second composition around the core of the granules;
    wherein the first composition and the second composition comprise urea, and wherein the density of the granule is below 1330 kg/m$^3$, and wherein the density of the core of the granule is lower than the density of the shell of the granule.

12. Granules prepared according to the process of claim 1.

* * * * *